United States Patent Office 2,759,792
Patented Aug. 21, 1956

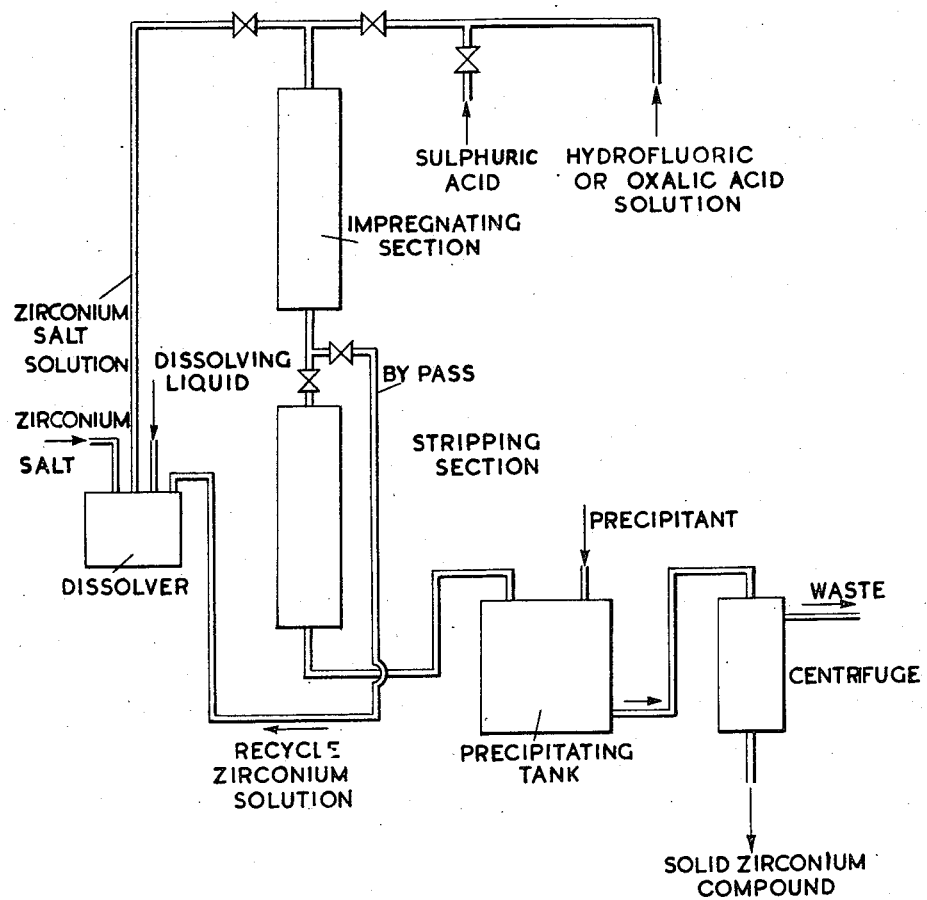

2,759,792

SEPARATING HAFNIUM FROM ZIRCONIUM

Bryan Alfred Jack Lister, James Francis Duncan, and John Malcolm Hutcheon, Strand, London, England Application February 21, 1951, Serial No. 212,030

3 Claims. (Cl. 23—19)

This invention relates to the separation of zirconium and hafnium by employment of ion exchange methods.

Some degree of separation of zirconium and hafnium by such methods has been reported by Street and Seaberg (J. A. C. S. 70, 4268 (1948)) using a method based on elution by 6N hydrochloric acid from a column of cation exchange material known as "Dowex 50" and consisting of a sulphonated polystyrene resin; and by Kraus and Moore (J. A. C. S. 71, 3263 (1949)) using a mixture of hydrofluoric and hydrochloric acids to elute a mixture of the two elements from a column of anion exchange material. In co-pending application Serial No. 212,029 filed February 21, 1951, in the names of Bryan Alfred Jack Lister and James Francis Duncan there is described a process of separating zirconium from hafnium by effecting adsorption of compounds of the metals on a cation exchange material and eluting the said cation exchange material with 0.8 N to 1.5 N sulphuric acid.

For certain purposes zirconium with very low hafnium content is a requirement, and methods hiterto available have not simply achieved the necessary degree of purity.

The object of the invention is to provide a method of separating hafnium from zirconium whereby the latter may be prepared in a pure state substantially free from hafnium.

According to the invention substantially complete separation of zirconium from hafnium may be obtained by elution of ion exchange material, on which compounds of the elements are adsorbed, with an approximately normal solution of sulphuric acid. Preferably the acid concentration is between 0.8 N and 1.2 N and should not exceed substantially 1.5 N. Increase of the concentration of sulphate ion in the eluting solution by presence of a soluble sulphate, such as sodium sulphate, has been found to be advantageous.

The preferred ion exchange materials for use according to the invention are sulphonated polystyrene resins which may be prepared, for example, by the method described in United States Patent No. 2,366,007. Resins which may be employed are "Dowex 50" and Zeokarb 225." The ion exchange material is preferably arranged in the form of a column in a tube through which solutions for treatment and eluting solutions are passed.

The following are examples of preferred ways of carrying the invention into effect.

Example 1

A column of ion exchange resin known as "Dowex 50" or "Zeokarb 225" 4 feet long is arranged in an inert tube of one inch internal diameter, the tube having an internal step or constriction to support a perforated plate on which the resin is supported. The resin column is washed with mineral acid to convert it to acid form. A 0.01 to 0.1 M solution in 1 to 2 N hydrochloric, nitric or perchloric acid of zirconium oxychloride or other soluble zirconium salt and associated hafnium impurity (in amount equal to about two percent by weight of the zirconium) was seeded with a tracer quantity of radioactive zirconium (Zr 95) and hafnium (Hf 181) and introduced into the top of the column. A total amount of solution equivalent to 10 gm. of zirconia could be treated by the quantity of resin in the column at one time. After the solution had passed through the column, aqueous N sulphuric acid was passed through the column and the eluate was continuously monitored by means of a Geiger-Müller tube and appropriate amplifier. External counting of the column was also carried out.

When volume of eluate was plotted against radioactivity as indicated by the eluate counter two distinct and widely separated bands were obtained, the zirconium responsible for the first band passing quite rapidly from the column and the hafnium resulting in the second band passing much more slowly. The eluate collected during the first band contained from 98 to 99 per cent of the zirconium originally present and oxide precipitated from the solution showed on spectrographic analysis less than 0.01 per cent of hafnium.

Hafnium remaining in the column after collection of the zirconium was readily removed by eluting with a complexing agent for the hafnium, preferably dilute hydrofluoric acid of, for example 0.05 per cent concentration. Dilute aqueous oxalic acid may be used as alternative. After washing the column with mineral acid, a further batch of zirconium salt could be treated. If conditions as to concentrations and amounts are kept the same, N sulphuric acid eluate in amount equal to that corresponding to the first band could be collected and would be found to contain substantially all the zirconium of the purity specified above.

As an alternative to the above method, zirconium and its attendant hafnium impurity may be brought into solution in 0.8 to 1.2 N aqueous sulphuric acid and the solution passed on to a column of "Dowex 50" resin, or similar ion exchange resin, previously rendered acid by treatment with normal sulphuric acid. Further sulphuric acid of the normality used for the solution may then be passed through the column to complete the elution. Eluate is collected throughout the run and the first fractions of it will contain zirconium having a hafnium content less than 0.05 per cent. Where hydrofluoric acid is used to elute hafnium, it may be found preferable to employ a perspex or Lucite tube to hold the cationic exchange material.

From runs with other eluting agents it is concluded that the separation obtained is due to difference in complexing behaviour. Thus with 3 N perchloric acid, a solution in which zirconium is believed to be little complexed, the zirconium and hafnium show very little tendency to move down the column. With 3 N hydrochloric acid considerable but inadequate separation was achieved and the hafnium was eluted first, and higher concentrations of acid gave smaller separations. 3 N nitric acid showed no separation, although the one band observed moved down the column at the same rate as did the zirconium band when 3 N hydrochloric acid was used. The latter is in agreement with an observation by Connick and McVey (J. A. C. S. 71, 3182 (1949)) that zirconium is equally complexed in solutions of 2 N hydrochloric and nitric acids.

Example 2

A zirconium separation system comprising two columns of cation exchange resin Zeokarb 225, each in Pyrex pipe 3 inches in diameter and 9 feet long and each column containing 9 kg. of resin, was arranged with the columns having such connections that liquor passing from the one (the upper) could either be passed through the other (the lower) column or could by-pass the other column and either be returned to the source of the solution being treated or discharged to waste or recovery plant. In operation substantially 750 gm. of zirconium as nitrate in the form of a 0.01 M solution in 2 N nitric acid was passed into the upper column of resin, previously converted to the acid form by treatment with mineral acid. The outlet of the upper column is connected so as to return excess discharged liquor to the zirconium solution supply tank. In this way the upper column of resin becomes impregnated with up to 750 gm. of zirconium. The discharge outlet of the upper column is then connected to the inlet of the lower column (the resin of which is in the acid form) and N sulphuric acid is passed through the upper and the lower column and eluate from the lower column collected for recovery of the zirconium. The progess of elution may be followed by employing radioactive tracer zirconium and hafnium as in the case of Example 1, an effluent counter connected to an effluent monitor and a recorder being employed. In addition the distribution of zirconium in columns could be followed by means of G. M. tubes spaced along the columns. A yield of up to 90 per cent of the adsorbed zirconium with a hafnium content less than 0.05 per cent is obtained in the eluate during the first band (volume of eluate-v-activity). Hafnium adsorbed in the column is removed by elution with 0.5 per cent aqueous oxalic acid the eluate being separately collected.

After removal of the hafnium and washing of the columns with 2 N nitric acid, a further like quantity of 0.01 M zirconium nitrate in 2 N nitric acid may be passed into the upper column, the discharge from which is again returned to the solution container. The two columns are then connected again and elution with N sulphuric acid carried out. A quantity of eluate equal to that of the first band (activity-v-volume eluate) in the initial operation is collected for the zirconium and hafnium remaining in the column is eluated by 0.5% aqueous oxalic acid as before. Thus the process may be repeated without the need for radioactive tracers if quantities are maintained substantially constant and periodic analyses are carried out as a check on operation.

Apparatus suitable for carrying out the method of Example 2 is illustrated diagramatically in the accompanying drawing.

Impure zirconium nitrate (0.01 M) in 2 N aqueous nitric acid is supplied to the zirconium solution container. From the container the solution is passed to the top of the upper column (adsorption) and the valves at the outlet of the column are operated so that excess solution passes by way of the by-pass back to the solution container. When adsorption is complete and excess solution has drained off, the valves are operated to close the by-pass line and connect the upper column to the lower column. The valve in the solution line to the upper column is closed and that from the N sulphuric acid line to the upper column opened. N sulphuric acid then flows through both columns in turn, eluting the zirconium from the upper column. In the lower (stripping) column any hafnium accompanying zirconium in the eluate from the upper column becomes largely adsorbed on the Zeokarb 225. The eluted zirconium solution may pass to a precipitation chamber where zirconium hydroxide may be precipitated by alkali, the resulting slurry passing to a centrifuge where the zirconium compound is freed from accompanying aqueous liquor. When elution of zirconium is complete the N sulphuric acid line is closed and the hydrofluoric acid or oxalic acid solution line is opened to elute the hafnium remaining on the Zeokarb 225. This eluate is collected in a separate receiver.

We claim:

1. A semi-continuous process of producing zirconium compounds substantially free from hafnium using as starting material zirconium nitrate containing hafnium, which comprises bringing the zirconium nitrate into solution in aqueous nitric acid, passing solution so produced into a first column of cation exchange resin in acid condition to bring about adsorption of zirconium and hafnium on the resin, returning excess solution from the column for further treatment, connecting the lower part of the said column to the upper part of a further column of cation exchange resin, passing eluting solution consisting of 0.8 to 1.5 N sulphuric acid through the said first column and the further column in succession collecting the zirconium-containing eluate leaving the further column, eluting the columns with aqueous oxalic acid solution to remove hafnium adsorbed in the columns, collecting the hafnium containing eluate separately, washing both columns with aqueous nitric acid, and repeating the cycle of operations.

2. A semi-continuous process of producing zirconium compounds substantially free from hafnium using as starting material zirconium containing hafnium impurity, which comprises bringing a solution of the zirconium nitrate in aqueous nitric acid into a first column of cation exchange resin in acid condition to bring about adsorption of the zirconium and hafnium on the resin, returning excess solution from the column to the supply, connecting the lower part of the said column to the upper part of a second column of cation exchange resin in acid condition, passing eluting solution consisting of 0.8 to 1.5 N sulphuric acid through the first column and through the second column in succession, collecting zirconium containing eluate in a receiver, adding alkali to the eluate to precipitate zirconium hydroxide, recovering zirconium hydroxide, eluting the first and second columns in succession with an eluate of the group consisting of aqueous solutions of oxalic acid and hydrofluoric acid to elute the hafnium adsorbed on the cation exchange resin collecting the eluate separately and washing the columns with aqueous nitric acid preparatory to repeating the process steps.

3. A method of recovering zirconium substantially free from hafnium wherein zirconium nitrate containing hafnium in solution in aqueous nitric acid is passed through a first column of sulphonated polystyrene ion exchange resin in acid condition to bring about adsorption of zirconium and hafnium on the resin, the column of resin is eluted with 0.8 N to 1.5 N aqueous sulphuric acid and the eluate from the first column of resin is passed through a second column of sulphonated polystyrene ion exchange resin in acid condition, the initial portion of eluate leaving the said second column of resin containing the greater part of the zirconium with a substantially reduced hafnium content is collected, the elution with sulphuric acid is discontinued when the zirconium content falls to a low value, the two columns are eluted serially with an aqueous solution of a complexing agent for hafnium to remove from the columns and the hafnium containing eluate is separately collected.

References Cited in the file of this patent

Ayres: Purification of Zirconium by Ion Exchange Columns, MDDC-1026, June 30, 1947, 7 pages; U. S. Atomic Energy Commission.

Street et al: The Ion Exchange Separation of Zirconium and Hafnium, AECD-2435, October 11, 1943, 2 pages; U. S. Atomic Energy Commission.

Industrial & Engineering Chemistry, vol. 40, pages 1350–5 (1948).